June 13, 1961 — E. WITZKE — 2,988,258

CUP

Filed Dec. 17, 1957 — 2 Sheets-Sheet 1

INVENTOR.
Edmund Witzke
BY
Attorney

June 13, 1961  E. WITZKE  2,988,258
CUP
Filed Dec. 17, 1957  2 Sheets-Sheet 2
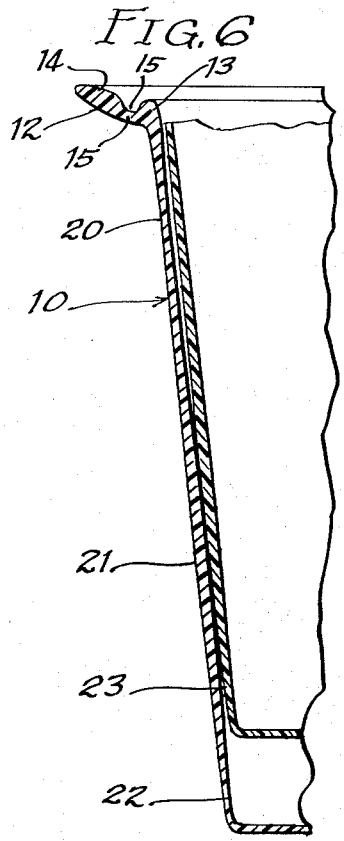
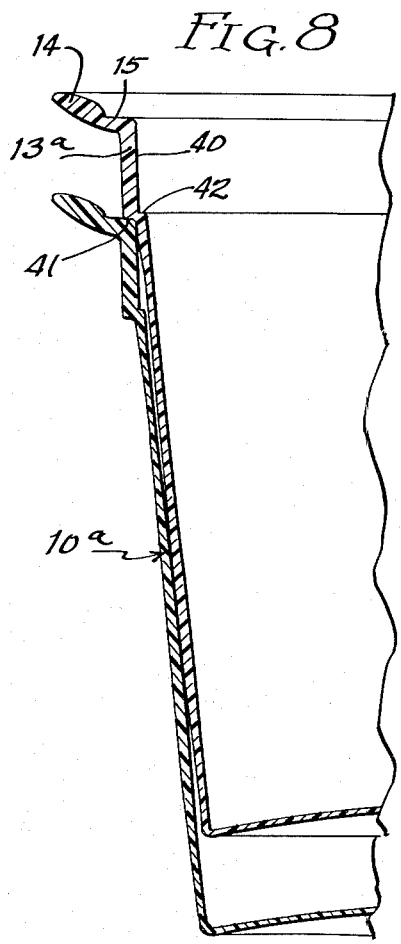
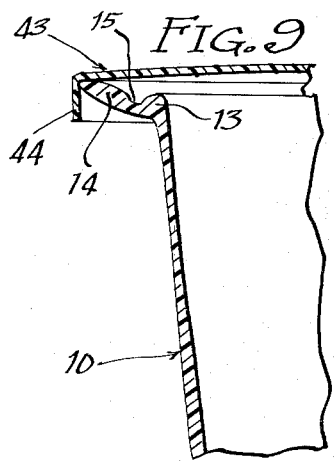
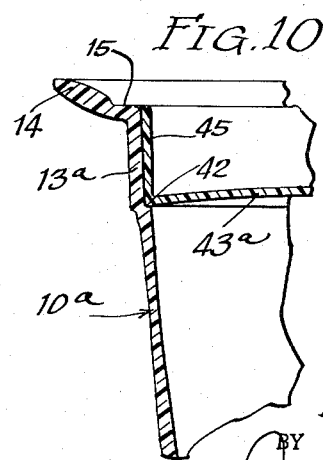
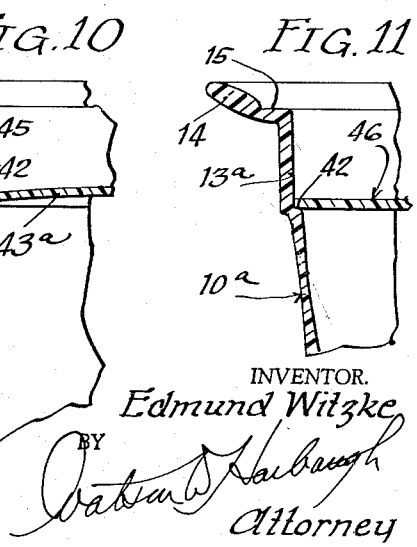
INVENTOR.
Edmund Witzke
BY
Attorney United States Patent Office 2,988,258
Patented June 13, 1961

2,988,258
CUP
Edmund Witzke, 27465 Spring Arbor Drive, Royal Oak, Mich.; Helen G. Witzke, administratrix of the estate of said Edmund Witzke, deceased
Filed Dec. 17, 1957, Ser. No. 703,387
12 Claims. (Cl. 229—1.5)

The present invention relates generally to open mouth containers having tapering side walls and more particularly to plastic bowls, jars and cups for receiving liquids, such as beverages of all kinds and at all potable temperatures.

As used herein for purposes of brevity the word cup is intended to include all open mouth containers, with or without closures for liquids and beverages, and the word "drink" refers to all drinks including soft drinks, alcoholic drinks, hot and cold drinks and medicinal liquids. Also by way of simplification but without limitation as to size, one example of cups is described herein which is of a size that is used in conventional cup dispensers and coin controlled drink dispensers.

Heretofore, cups of the size described herein have been made of paper or injection molded plastics and difficulty has existed in stacking and dispensing them one at a time as by mechanical devices. Moreover, injection molded cups are not readily interchangeable with paper cups for stacking and dispensing in paper cup dispensers. The thickness required in the wall for injection techniques defeats a stacking that is close enough to be acceptable. Even paper cups provided with beaded edges hang up in dispensers. Furthermore, nested conventional cups having uniform wall thicknesses throughout their height stick together throughout their overlap as held by friction and vacuum conditions which prevent rapid separation. Not only this, but conventional beaded rims crack through or buckle easily when engaged by dispensing elements or when pressed out of round manually either intentionally or by accident. This is particularly true with conventional plastic cups which also split down the sides.

The problems are also well known of paper cups being unable to hold alcoholic drinks for any desired length of time, and injection molded cups require so much plastic material that their cost is prohibitive in competition with paper cups.

One of the objects of the present invention is to provide a plastic cup having a reinforced rim of two concentric thick rings connected by a web which enables the two rings to shift axially with respect to each other without breaking when lateral deforming pressures bear against the rim.

A further object is to provide a cup whose sides are thicker in the mid-portion for greater strength where they are generally gripped manually and this construction is also characterized by a restricted area of contact with like areas of cups nested therewith whereby separation manually or mechanically may be accomplished without undue strain upon the rim.

The invention is also characterized by a series of alternately different cup bottoms, displaced upwardly and downwardly for reinforcement, for facing and for weight bearing support, in that the contours mis-match with engaged contours in the bottoms of cups located above and below, said contours determining the nesting limit of the cups to as little as 3/16" compared with 1/4" conventional spacing with paper cups, yet may be handled by conventional paper cup dispensers interchangeably with paper cups.

Another object of the invention is it provide a wide bead-like rim for drinking and pouring which is grooved on its upper face to provide line contact with a person's lips to avoid the conventional wide area of unpleasant contact of a rim heated by hot beverages.

A further characteristic of the invention is a marginal edge on the rim tapering to a smooth edge that is blanked while still at molding temperatures to reduce internal stresses and brittleness which under strain would otherwise result in cracks and splits.

The cup of the present invention is characterized also by extra thinness in the side walls below the rim so that they are sufficiently flexible at this level as not to crack when the rim is distorted, yet receive adequate support from the rim and the thicker side walls therebelow that prevent tearing of the walls adjacent to the rim.

Another object of the invention is to provide a cup for one-time use which will receive and hold any drink indefinitely without any deterioration of the cup and without any contamination of the beverage, yet can be washed and reused repeatedly and is competitive with and better than paper cups. The invention also contemplates a cup which can be stored in stacks of 200 in a space where only 150 paper cups of like capacity can be stored.

Also of importance is the characteristic that the bottom of the cup is ribbed for support to provide spaced line contacts with a table top with the spaces between open to movement of air over the entire remaining portions of the bottom on all sides of such line contacts to reduce sweating and damage to the table top.

These being among the objects of the invention, other and further objects will become apparent from the description and drawing in which:

FIG. 6 is an enlarged sectional view of the rim and upper portion of the side wall;

FIG. 8 is an enlarged sectional view of another embodiment of the invention; and FIGS. 9, 10 and 11 are partial sectional views of different closure constructions used with the embodiments of the invention if desired.

Figure 1:
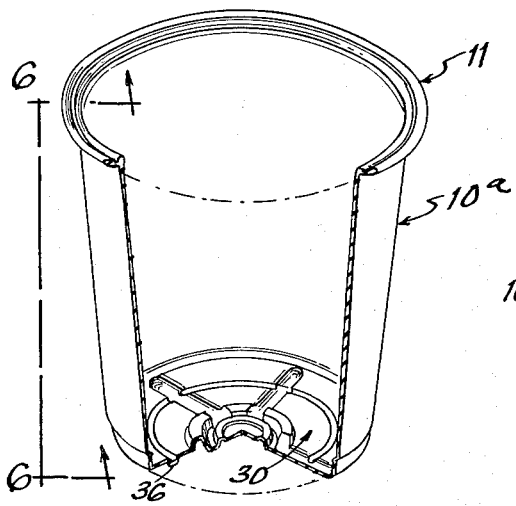
FIG. 1 is a side perspective, partially in section to show the example of the cup described herein at it appears from slightly above the level of the rim.
Figure 2:
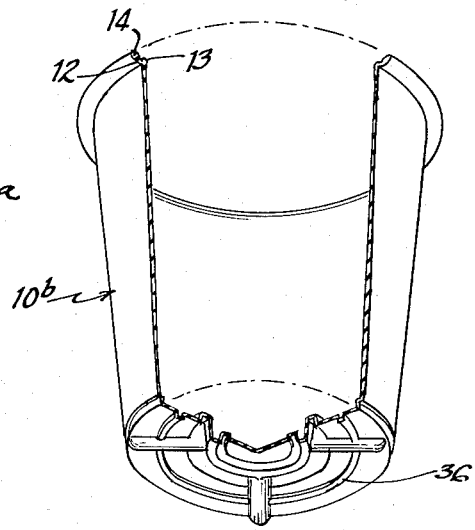
FIG. 2 is a view similar to FIG. 1 taken from slightly below the level of the bottom of the cup.

Referring now to the drawings in further detail, a cup is shown at 10 which is made preferably of high impact modified styrene such as Dow #475, and preferably from sheet material. The cup comprises a flange or rim 11 (FIG. 6) having an outwardly and upwardly rounded lower face 12 and two radially spaced beads 13 and 14 or rings upon its upper face interconnected by a web 15. The rounded contour 12 enables trouble-free interchangeable use in paper cup dispensing devices and the spaced rings 13 and 14 provide an air cooling area or groove 15 for the rim between limited contacts by the rings with a person's upper lip. Furthermore, the low location of the web in the rim enables the outer bead 14 to shift upwardly without breaking the rim when distorted laterally.

Below the rim the wall of the cup tapers at an angle of 5° to the vertical and is approximately .007 of an inch in thickness at 20, .012 of an inch in thickness in the middle at 21, and .007 of an inch in thickness adjacent the bottom at 22. Between these locations, the thickness tapers from one to the other preferably with the outside wall contour straight and the inside wall line curved inwardly, thereby providing a reinforcing thickness in the middle where the cup is generally gripped and a restricted area of contact indicated at 23 with a like cup 10a nested therein so that they are easily separated even though they are otherwise tightly packed.

At the bottom 30, downwardly extending ribs 31 are provided radiating outwardly from a central well portion 37, and upwardly extending segmented circular flanges 32 are provided to rigidify the bottom in weight bearing, non-tipping relationship. The lower radiating ribs are preferably sharply rounded at their lower extremity 33 for line contact with a supporting surface such as a table top, and the spaces 34 between the ribs are open around the bottom for the free movement of cooling air to prevent harm by hot drinks on table tops.

Figure 3:
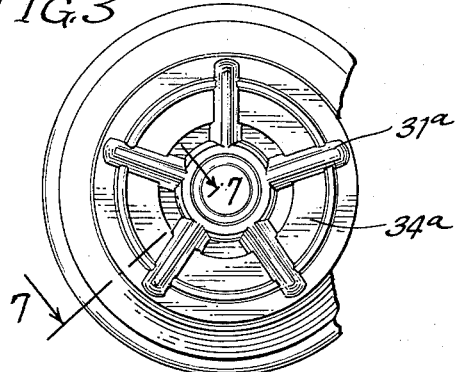
FIG. 3 is a bottom plan view of one contour embodiment of the invention.
Figure 4:
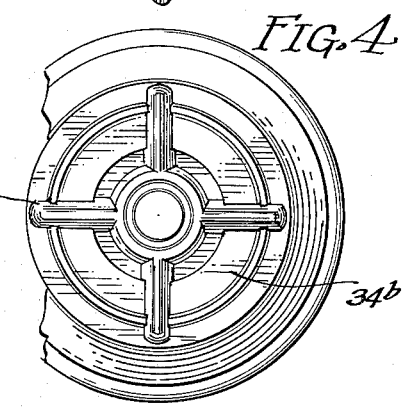
FIG. 4 is a bottom plan view of another contour embodiment of the invention whereby cups having these respective bottom contours may nest at their walls but not their bottoms.
Figure 5:
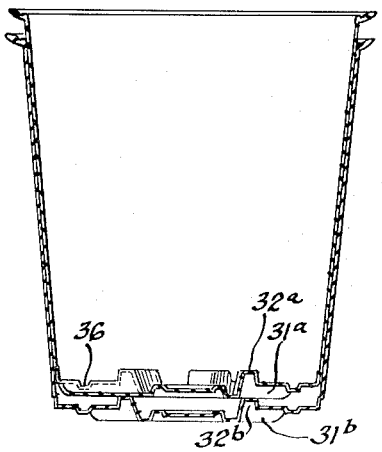
FIG. 5 is a vertical section taken through two nested cups having respectively the embodiments shown in FIGS. 3 and 4 whereby the non-matching bottoms engage in a relationship determining the depth or spacing of the nesting relationship.

In connection with FIGS. 3 and 4 it will be noted that the radiating ribs 31 and segmented circular flanges 32 define different geometric patterns so that when cups having different bottom patterns are nested, the contours thereof will not nest but will support the nested cups in spaced relationship against undue compacting so that the spacing of the rims of the nested cups is acceptable to conventional dispensers of paper cups. In FIG. 3 the ribs 31a are five in number. In FIG. 4 the ribs 31b are four in number. Other numbers may be provided, but these are sufficient for stacking for the use and purposes mentioned.

The overall height of the ribs and flanges in the bottom may vary from that shown, but preferably is 3/16". If dispensers are built to accommodate less, same can be as little as 5/32" and as much as 3/8" for all practical purposes.

A further advantage with the ribs is found in the combination therewith of the rim so that a person may hold a cup of hot liquid with comfort. The thumb and forefinger lightly hold the margins of the rim while the last two fingers can engage the ribs transversely with only sufficient contact pressure to assist in holding the cup without spilling its contents.

Figure 7:
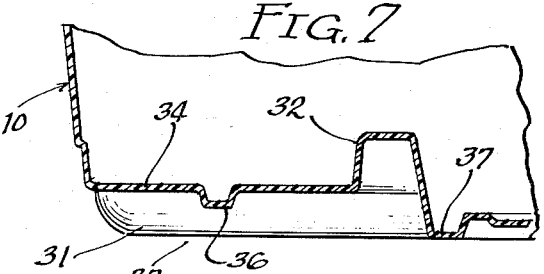
FIG. 7 is a sectional view taken upon the line 7—7 in FIG. 3.

As shown in FIG. 7, the ribs 31 extend to outer edge of the bottom for maximum stability against tipping and for added strength downwardly extending circular rib portion 36 interconnects the adjacent faces of the ribs 31 to provide them with lateral strength. Moreover, the upper face of the bottom 30 is so channeled and recessed that high mixing turbulence is induced among ingredients poured into the cup by a mixed drink dispensing machine, particularly with a central well and interconnected channels radiating therefrom as shown.

The cup is further characterized by the material in the side walls being vertically stressed in the drawing process which forms the cup so that lines of force imposed upon the cup walls in weight bearing relationship are coincident with the direction in which the material is drawn.

A further embodiment is shown in FIGS. 8, 10 and 11 wherein the stacking elements are arranged at the top of the cup with a contour such that the cup can also be used with closures of any one of several types such as cap tops with flanges received inside the rim as well as outside the rim, or plug type closures such as a disk or cork received inside of the rim, and in which the bottom may be substantially flat.

In the embodiment shown in FIG. 8 the two rings 13 and 14 of FIG. 6 are preferably spaced vertically as well as horizontally on opposite sides of the web 15. More particularly, however, the inner ring 13a is spread downwardly to provide a relatively heavy cylindrical or slightly tapered wall 40 terminating at the top level with the web 15a and at the lower edge in an external offset providing a shoulder 41 on the outside approximately .1875 of an inch below the top of the web 15a and also a narrow inner shoulder 42 which serves as a stop for a plug type closure.

The web 15a in addition to serving in the capacities described with the other embodiments additionally serves as a rest engaged by the shoulder 41 of the cup above it when the cups are stacked for dispensing machines. Furthermore, the shoulder 41 serves as a finger edge for handling and being held by hand.

Referring to FIGS. 9, 10 and 11 it will be noted how cap and plug type closures may be used when desired with the cups. In FIGS. 9 a snap cap cover is shown which is crowned slightly in the center with the flange 44 received over the rim of the ring 14. Attaching the cup is facilitated by downward pressure at the center of the cap, which when released permits the flange to tighten against the edge. This cap can be used with either embodiment.

In FIG. 10, the closure is also a cap which can be received with the cylindrical flange 45 disposed upwardly or downwardly. If upwardly, as shown in FIG. 10, which is the preferred manner, downward pressure on the center of the closure relaxes frictional contact with the wall 40 and when released permits a tightening with the wall 44 which holds the closure in place.

FIG. 11 shows a plug type lid 46 of the disk form which slides along the wall 44. If the wall is slightly tapered the engagement provides a snugness when the shoulder 42 is reached that provides a firm sealed relationship which can only be released by destruction of the ring 13a, thus providing a one time use of the cup when sealed in this manner, the wall 40 yielding outwardly enough to pass and embed the edge of the lid 46.

Having thus described the invention in connection with a particular sized cup it will be appreciated by those skilled in the art that various other sizes can be constructed and furthermore how the stated objects are fulfilled and how other and further changes and modifications of the bottoms thereof can be made without departing from the spirit of the invention, the scope of which is commensurate with the appended claims.

What is claimed is:

1. A thin walled stretch-formed cup having a bottom wall and diverging side walls extending upwardly therefrom and terminating in an outwardly extending rim at the top, said side walls gradually varying in thickness from top to bottom over the major portion of their height, said rim comprising a radially extending flange convexly rounded throughout its width on one side and having a groove on the other side dividing said rim into radially spaced rings disposed on opposite sides of a thin radial web, said web being thinner in vertical section than said spaced rings.

2. A thin walled stretch-formed cup comprising a bottom wall, and upwardly extending diverging side walls terminating at the top in an outwardly extending rim of a radial width greater than twice its thickness, said side walls tapering in thickness from said rim over a portion of their vertical length and gradually varying in thickness from the top to the bottom, said rim comprising a radially extending flange convexly rounded on one side and concavely formed along an annular portion on the other side to divide said rim into two radially spaced thick ring portions separated by a reduced section laterally disposed outside of the upward projection of said walls, the inner one of said ring portions forming in part the upper edge of said walls.

3. The combination called for in claim 2 in which said concave portion is defined by diverging side walls defining the adjacent portions of said ring portions.

4. A thin walled stretch-formed cup having a side and bottom and including a radially outward extending rim at the top of the side rounded on its lower side and having radially and vertically spaced thick rings at its marginal edges on opposite sides of a thin radial web, an inwardly tapered wall extending downwardly from the inner one of said rings and terminating in a bottom closing the lower end of the wall, said wall being thinnest at the upper and lower portions and thickened in the middle portion.

5. A cup comprising a radially outward extending rim having a width greater than twice its thickness and rounded outwardly and upwardly on its lower side, said rim having an upwardly facing groove in its upper face intermediate its marginal edges defining horizontally spaced rings joined by a thin radial web, said web being thinner in vertical section than said spaced rings to flex when said rings are moved relative to one another in use.

6. A cup comprising a radially outward extending rim rounded on its lower side and offset downwardly upon its upper face intermediate its marginal edges to provide an upwardly facing groove therearound defined by diverging walls defining horizontally spaced rings joined by a thin radial web, an inwardly tapered wall extending downwardly from the inner one of said rings and terminating in a bottom closing the lower end of the wall, said wall being thinner at the upper and lower portions and thicker in the middle portion.

7. A cup comprising a radial outwardly extending rim rounded on its lower side and offset downwardly upon its upper face intermediate its marginal edges and defining horizontal spaced lands joined by a thin radial web, an inwardly tapering wall connected to the innermost one of said lands, said wall having its outer surface substantially straight in vertical section and its inner surface curved away from its outer surface intermediate its ends in vertical section, said wall being thicker nearer its vertical mid-portion than at its opposite ends, and a bottom element closing the lower end of said wall.

8. A cup comprising a radial outwardly extending rim rounded on its lower side and offset downwardly upon its upper face intermediate its marginal edges to provide an upwardly facing groove therearound defining horizontally spaced rings joined by a thin radial web, said web being thinner in vertical section than said rings to permit flexing and relative movement therebetween, and a side wall having inner and outer faces, one of said faces being substantially straight in vertical section and the other face being curved away from said one face intermediate its ends in vertical section, the distance between said faces being greatest near the mid-portion of the cup, thus providing a strong middle section and preventing sticking in nesting with other types of cups.

9. A cup comprising a radially outward extending rim having a width greater than twice its thickness and rounded outwardly and upwardly on its lower side and having radially and vertically spaced rings at its marginal edges on opposite sides of a thin radial web, said web being thinner in vertical section than said spaced rings thereby being able to flex when said rings sustain movement relative to one another, an inwardly tapered wall extending downwardly from the inner one of said rings and terminating in a bottom closing the lower end of said wall, said wall being thinner at the upper and lower portions and thickened in the middle portion, and said wall having inner and outer faces, one of these faces being substantially straight and the other face being curved away from said one face at the mid-portion between its ends in vertical section.

10. The combination called for in claim 9 in which said bottom comprises vertically spaced offsets of one of two non-interfitting patterns so that said cups when nested are supported in spaced relationship by said non-interfitting offsets, said offsets causing turbulence in liquids during pouring thereby assisting the mixing thereof in said cup, and such patterns providing openings thereunder to permit a circulation of air under cup.

11. A pair of cups comprising a radial outwardly extending rim on each, an inwardly tapering side wall extending downwardly from the inner edge of said rim on each nesting with each other, and a bottom wall of substantially uniform thickness throughout its area closing the lower end of each cup and having vertically spaced offset portions of one of two non-interfitting patterns so that said cups when nested are supported in spaced relationship by said non-interfitting offset portions, said offset portions on their upwardly facing surfaces causing turbulence in liquids during pouring thereby assisting the mixing thereof in said cup, and such offset portions on their downwardly facing surfaces providing openings for the circulation of air under the bottom wall of the cup.

12. A cup comprising a radially outward extending rim having a width greater than twice its thickness and rounded outwardly and upwardly on its lower side, a substantially cylindrical wall connected to the inner edge of said rim by a thin radial web and terminating at its lower end in an upwardly facing shoulder spaced vertically from said rim, and an inwardly tapered thin wall below said shoulder extending downwardly from the inner edge of said shoulder and spaced from the outer edge of said cylindrical wall at said shoulder to provide a downwardly facing shoulder on the outside of the cup and terminating in a bottom closing the lower end of the wall.

References Cited in the file of this patent

UNITED STATES PATENTS

| | | |
|---|---|---|
| 2,420,215 | Wiley | May 6, 1947 |
| 2,530,124 | Kieckhefer | Nov. 14, 1950 |
| 2,726,517 | Pruett | Dec. 13, 1955 |
| 2,768,667 | Hill | Oct. 30, 1956 |
| 2,828,789 | Groendyk et al. | Apr. 1, 1958 |